United States Patent
Williams et al.

(10) Patent No.: US 11,689,447 B2
(45) Date of Patent: *Jun. 27, 2023

(54) ENHANCED DYNAMIC ENCRYPTION PACKET SEGMENTATION

(71) Applicants: AT&T Intellectual Property I, L.P., Atlanta, GA (US); AT&T Intellectual Property II, L.P., Atlanta, GA (US)

(72) Inventors: Stuart J. Williams, Annandale, VA (US); Timothy Tuggle, Trussville, AL (US); James Thompson, Helotes, TX (US); Jimmy Slagle, Greensboro, NC (US); Mary Phillips, San Antonio, TX (US); James Wall, San Antonio, TX (US)

(73) Assignees: AT&T INTELLECTUAL PROPERTY I, L.P., Atlanta, GA (US); AT&T INTELLECTUAL PROPERTY II, L.P., Atlanta, GA (US)

(*) Notice: Subject to any disclaimer, the term of this patent is extended or adjusted under 35 U.S.C. 154(b) by 210 days.

This patent is subject to a terminal disclaimer.

(21) Appl. No.: 16/953,753

(22) Filed: Nov. 20, 2020

(65) Prior Publication Data

US 2021/0092050 A1    Mar. 25, 2021

Related U.S. Application Data

(63) Continuation of application No. 16/020,706, filed on Jun. 27, 2018, now Pat. No. 10,887,218.

(51) Int. Cl.
*H04L 29/06*      (2006.01)
*H04L 45/24*      (2022.01)
*H04L 45/586*    (2022.01)
*H04L 9/40*        (2022.01)

(52) U.S. Cl.
CPC ............ *H04L 45/24* (2013.01); *H04L 45/586* (2013.01); *H04L 63/0464* (2013.01); *H04L 63/062* (2013.01); *H04L 63/18* (2013.01)

(58) Field of Classification Search
CPC ... H04L 45/24; H04L 45/586; H04L 63/0464; H04L 63/062; H04L 63/18
USPC ........................................................ 713/153
See application file for complete search history.

(56) References Cited

U.S. PATENT DOCUMENTS

| | | | |
|---|---|---|---|
| 8,284,943 B2 | 10/2012 | Carrasco | |
| 9,084,234 B2 | 7/2015 | Kolbe et al. | |
| 9,407,496 B2* | 8/2016 | Wen | .......... H04L 41/0663 |
| 9,407,545 B1 | 8/2016 | Ghosh | |
| 9,806,886 B2 | 10/2017 | Rajsic | |
| 9,813,343 B2 | 11/2017 | Williams et al. | |
| 9,900,778 B2 | 2/2018 | Chen et al. | |
| 9,942,247 B2 | 4/2018 | Seul et al. | |

(Continued)

*Primary Examiner* — Evans Desrosiers
(74) *Attorney, Agent, or Firm* — Guntin & Gust, PLC; Mark Wilinski

(57) ABSTRACT

A communication session may be broken up into many smaller packet bundles over many tunnels and over different routes in order to obfuscate the entire data stream. Apparatuses may dynamically build hop-by-hop tunnels in a backbone telecommunications network, segment data into packet bundles at the customer edge, or break up data traffic of a communication session along multiple routing or switching paths in order to obfuscate the data traffic of the communication session.

20 Claims, 9 Drawing Sheets

(56) References Cited

U.S. PATENT DOCUMENTS

| | | | |
|---|---|---|---|
| 2006/0083215 A1* | 4/2006 | Uttaro | H04L 12/4645 |
| | | | 370/351 |
| 2008/0107033 A1 | 5/2008 | Zhang et al. | |
| 2017/0006070 A1* | 1/2017 | Lee | H04L 65/1066 |
| 2017/0093611 A1 | 3/2017 | Arora et al. | |
| 2017/0111261 A1 | 4/2017 | Francois et al. | |
| 2017/0180207 A1 | 6/2017 | Chintakunta et al. | |
| 2018/0091417 A1 | 3/2018 | Ore et al. | |
| 2018/0359811 A1 | 12/2018 | Verzun et al. | |

* cited by examiner

ENHANCED DYNAMIC ENCRYPTION PACKET SEGMENTATION

CROSS-REFERENCED TO RELATED REFERENCES

This application is a continuation of, and claims priority to, U.S. patent application Ser. No. 16/020,706, filed Jun. 27, 2018, entitled "Enhanced Dynamic Encryption Packet Segmentation," the entire contents of which are hereby incorporated herein by reference.

BACKGROUND

Businesses may have a geographically dispersed sites, in which they are connected on different parts of a city or the world. These sites may be connected using circuits with initially untrusted network connections. Conventionally, businesses may build DMZs with firewalls and employ tunnel encryption, such as IPsec or type-1 encryptors, to encrypt traffic between sites. In other words, there may be an encrypted tunnel or a firewall at each site (end-to-end). In the event a business's edge encryption is compromised, malicious users may view the entire data stream as if it were in the clear. This disclosure is directed to addressing issues in the existing technology.

SUMMARY

Conventionally encryption tunnels are provisioned end-to-end across backbone network and all traffic is sent over one tunnel. When the tunnel is compromised in conventional systems, the data stream may be compromised at any point along the path of the tunnel. Disclosed herein are methods, systems, and apparatuses that may dynamically build tunnels (e.g., hop-by-hop) or break up data traffic of a communication session along multiple routing (or switching) paths in order to obfuscate the data traffic.

In an example, an apparatus may include a processor and a memory coupled with the processor that effectuates operations. The operations may include detecting a communication session to a first address, wherein the communication session may include a first plurality of data packets and a second plurality of data packets, or more pluralities, depending on the required amount of obfuscation; determining a plurality of routes to the first address, wherein the plurality routes may include a first route and a second route or more; receiving an indication of packet segmentation or encryption; based on the indication of packet segmentation or encryption, sending the first plurality of data packets of the communication session to the first route and sending the second plurality of data packets of the communication session to the second route and so on until the number of plurality is exhausted. The first route may include a first plurality of routers, and the second route may include a second plurality of routers, wherein the first plurality of routers and the second plurality of routers are different. Each hop of the first route and the subsequent routes may be encrypted using randomly generated encryption keys, which may be from a centrally-based software-defined network controller. While traditional routing sends data across the best path, this approach may include the use of other sub-optimal paths to send data. This approach may create multiple tunnels across the best path, logically separating the data or physically separating the data by taking a sub-optimal route path. The determined plurality of routes to the first address may be based on type of communication session, wherein the type of communication session may be voice, video, file transfer, or email. The type of communication session may be connection-less or connection oriented.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally encryption tunnels are provisioned end-to-end across a backbone network and traffic is usually sent over one tunnel. When the tunnel is compromised in conventional systems, the data stream may be compromised at any point along the path of the tunnel and the entire data may be compromised. Disclosed herein are methods, systems, and apparatuses that may dynamically build tunnels (e.g., hop-by-hop) or break up data traffic of a communication session along multiple routing (or switching) paths in order to obfuscate the data traffic.

A communication session may be broken up into many smaller packet bundles over many tunnels and over different routes in order to obfuscate the entire data stream. If a malicious actor compromises one tunnel, then the amount of data compromised may not provide enough context or enough of the data file or data stream of the communication session to reconstruct the full communication session. The disclosed techniques may provide sufficient obfuscation that may substitute for expensive type-1 hardware encryption, currently deployed single-threaded logical encryption tunnels, or the like. Customers still may provision customer-edge to customer-edge tunnels.

Figure 1:
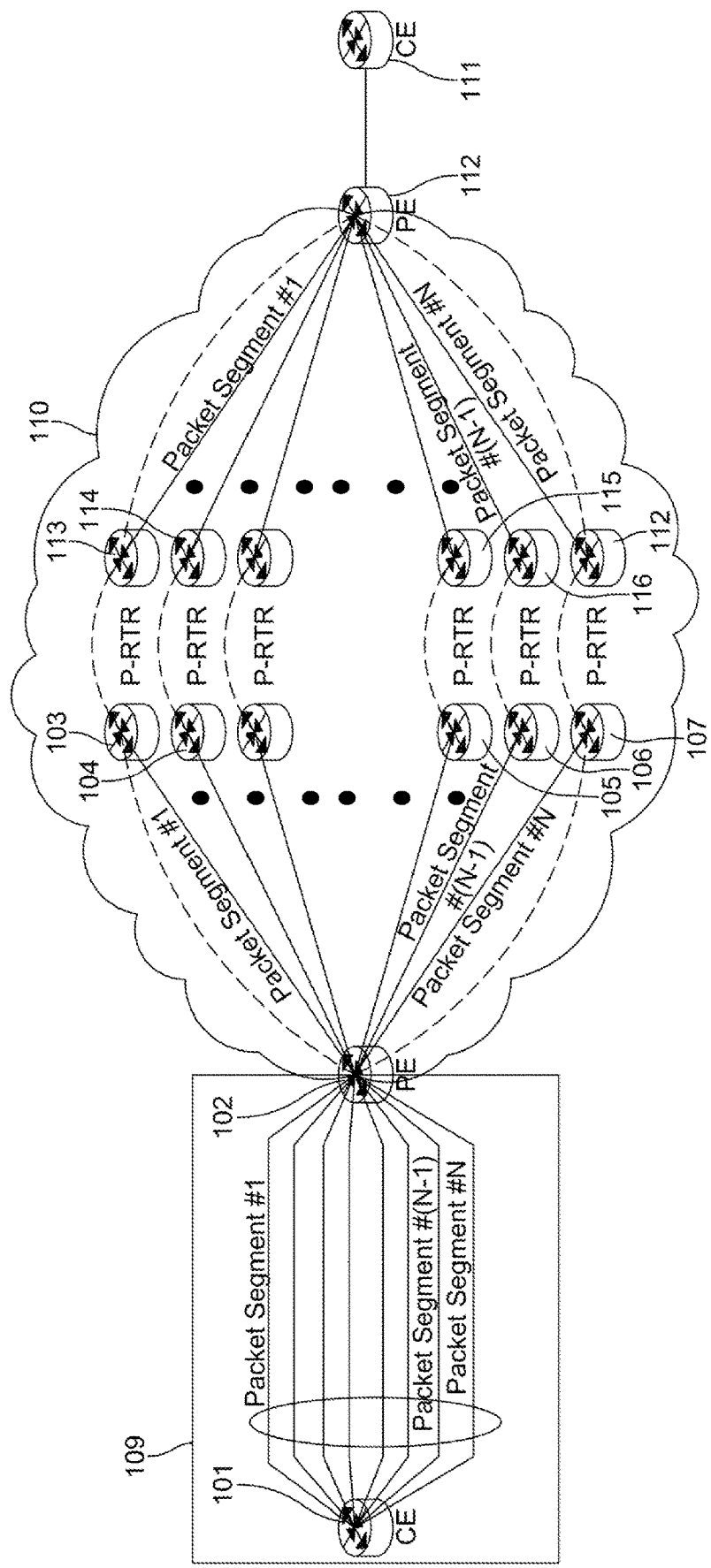
FIG. 1 illustrates an exemplary system for dynamic encryption or packet segmentation.

FIG. 1 illustrates an exemplary system for dynamic encryption or packet segmentation. Customer edge (CE) router 101 may be communicatively connected with CE router 111 via telecommunications network 110. CE router 101 may be communicatively connected with provider edge (PE) router 102 and CE router 111 may be communicatively connected with PE router 112. As shown in block 109, CE router 101 may be connected with PE router 102 in multiple different ways. There may be a plurality of physical connections between CE router 101 and PE router 102 or there may be a plurality of virtual connections between CE router 101 and PE router 102. In telecommunications network 110 there may be a plurality of virtual or physical connections from PE router 102 or PE router 112 to other respective P router 103 through P router 107 or P router 113 through P router 117. It is contemplated herein that there may be one or more PE routers 112 that communicatively connect with one or more CE routers 111.

Figure 2:
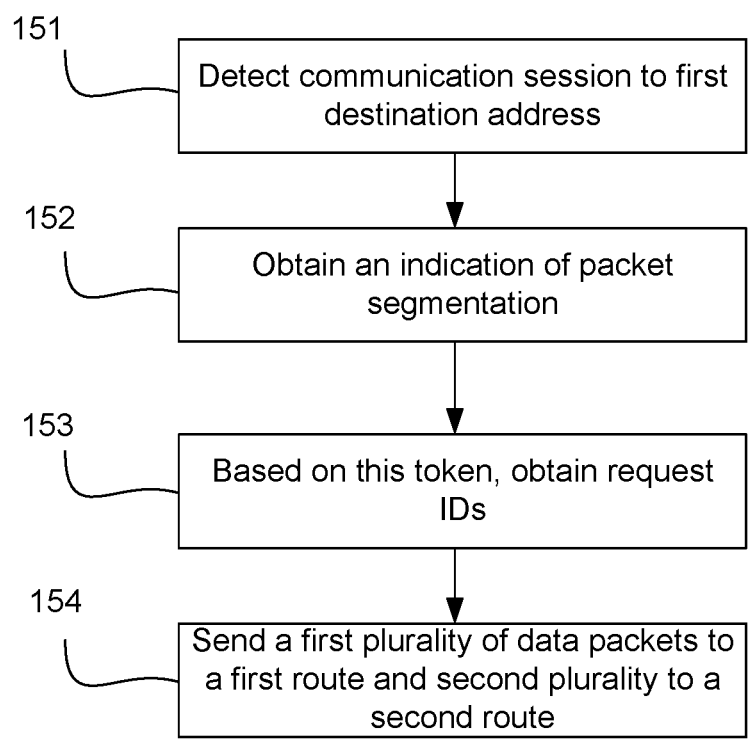
FIG. 2 illustrates an exemplary method for dynamic encryption or packet segmentation.

FIG. 2 illustrates an exemplary method for dynamic encryption or packet segmentation. At step 151, a communication session may be detected. In an exemplary scenario, there may be a communication session (e.g., a video communication session or transmitting an email) from a first site that includes CE router 101. The destination of the video communication session may be a second site that includes CE router 111. At step 152, an indication for packet segmentation for the video communication session or file transfer may obtained by CE router 101. This indication of packet segmentation may indicate to CE router 101 that it should send video communication session or file transfer over a plurality of routes, which may be physical or virtual.

At step 153, based on the indication of packet segmentation of step 152, CE router 101 at the customer edge or PE router 102 at the service provider edge may determine a plurality of routes to use for the video communication session or file transfer. The use of different routes (e.g., segments) and patterns (e.g., number of packets, number of segments, or used segments) may be based on different factors, which are disclosed in more detail herein. At step 154, a first plurality of data packets of the video communication session may be sent through a first route and second plurality of data packets of the video communication session may be sent the through a second route, and so on. Here, CE router 101 may instruct packets of the video communication or file transfer session to go through different routes (e.g., segments). For example, based on the indication and determined routes, CE router 101 may send at a time t0 a first packet of the video communication or file transfer session through segment 141, a second packet of the video communication session through segment 142, a third packet of the video communication session through segment 143, and so on. In addition, segment 144 may receive two packets of the video communication session (e.g., a fourth and fifth packet) at time t0, segment 145 and segment 146 may receive three packets each at time t0 for the video communication session. This may be done in a round robin pattern or some other pattern (e.g., random or pseudo-random pattern). With reference to FIG. 2, PE router 112, CE router 111, or some other device (which may be within a customer's network) may combine the packets of the video communication session or file transfer.

With continued reference to FIG. 1 and FIG. 2, it is contemplated herein that PE router 102 may use a different routing pattern than previously used with CE router 101. For example, first packet and fifth packet may be sent together on a segment (e.g., PE router 102-PE router 103) or the third packet may be further split before being sent to the next hop.

Figure 3:
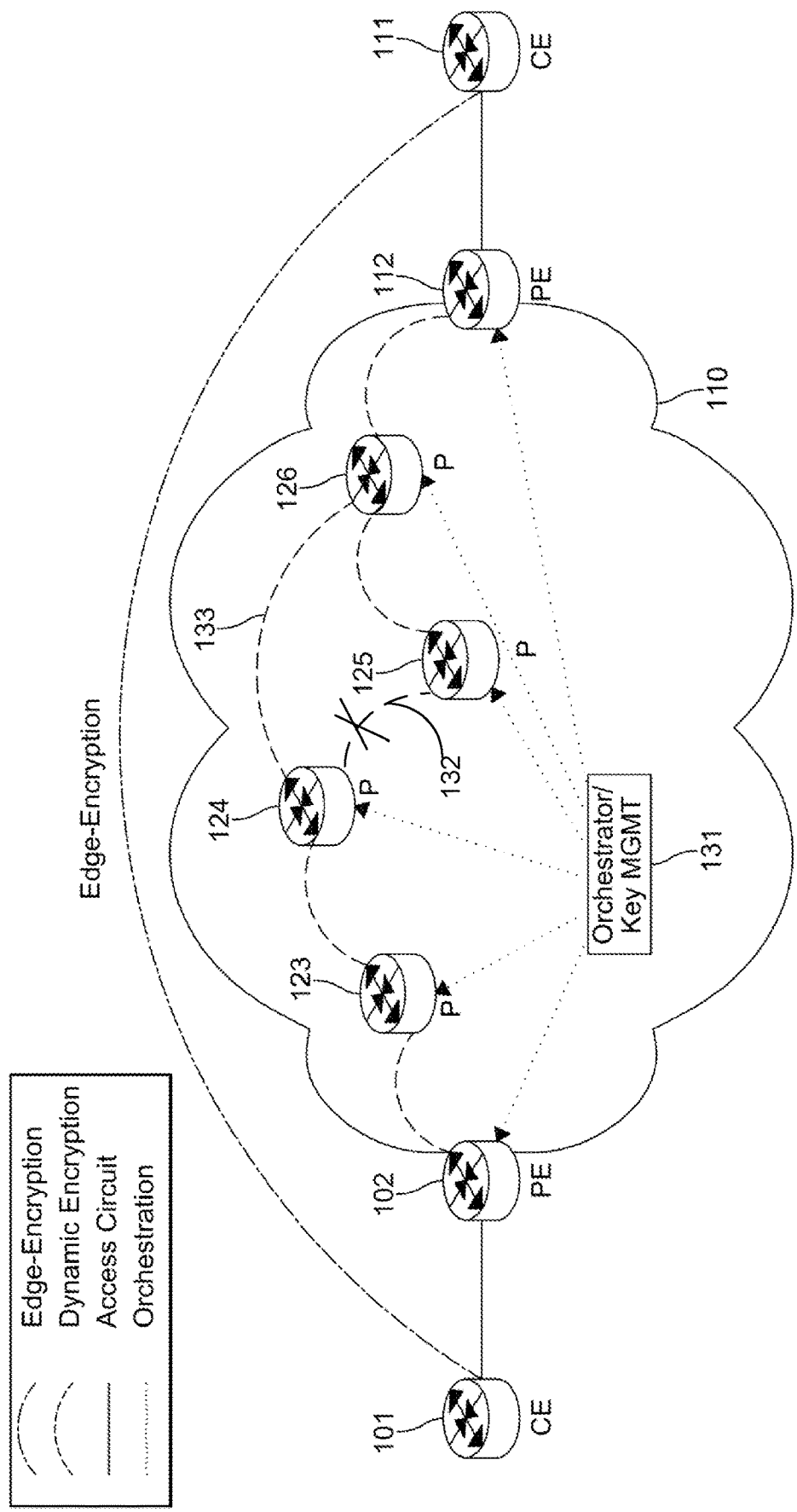
FIG. 3 illustrates an exemplary system for dynamic encryption or packet segmentation.

FIG. 3 illustrates an exemplary system for dynamic encryption or packet segmentation. Customer edge (CE) router 101 may be communicatively connected with CE router 111 via telecommunications network 110. CE router 101 may be communicatively connected with provider edge (PE) router 102 and CE router 111 may be communicatively connected with PE router 112. As shown in block 109 of FIG. 1, CE router 101 may be connected with PE router 102 in multiple different ways. Telecommunications network 110 may include a plurality of communicatively connected provider (P) routers, such as P router 123 through P router 126.

Figure 4:
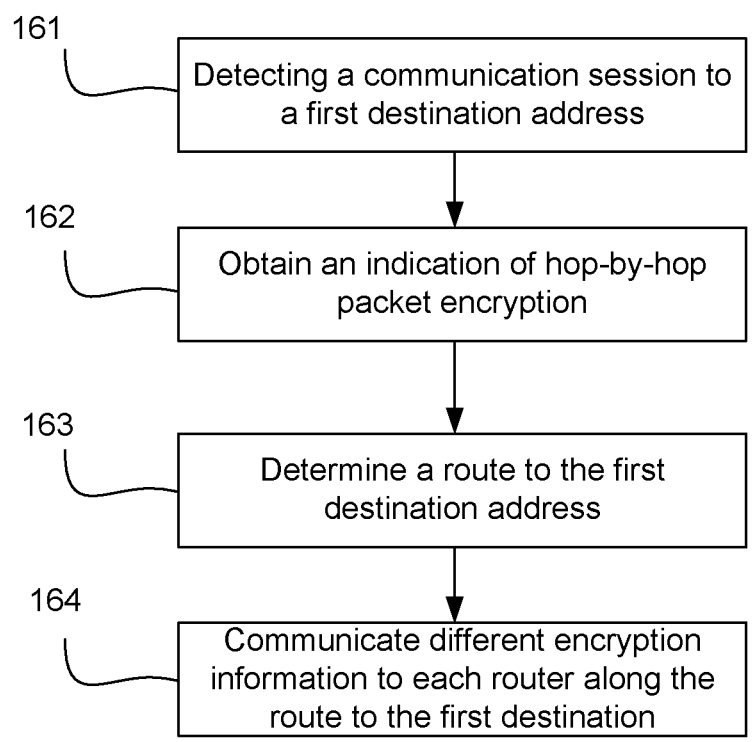
FIG. 4 illustrates an exemplary method for dynamic encryption or packet segmentation.

FIG. 4 illustrates an exemplary method for dynamic encryption or packet segmentation. At step 161, a communication session may be detected. In an exemplary scenario, there may be a communication session (e.g., a video communication session or file transfer) from a first site that includes CE router 101 in which the destination of the video communication or file transfer session is a second site that includes CE router 111. At step 162, an indication of packet encryption for the video communication or file transfer session may obtained by CE router 101. This indication of packet encryption may indicate to orchestrator 131 that it should coordinate encrypted tunnels between routers along the entire path or paths for the video communication or file transfer session over a plurality of routes or hops, which may be physical or virtual. Orchestrator 131 may be a software-defined network (SDN) controller that manages the encryption keys and communicates the encryption requirement (or other routing) along the path to the destination.

At step 163, the route to the first destination may be determined based on the indication of hop-by-hop packet encryption for the video communication or file transfer session of step 162. Determining the route may therefore determine each router (or the like device) that would implement encryption tunnels for the particular video communication or file transfer session. As shown in FIG. 3, a hop-by-hop path, starting from the provider edge, may be PE router 102-P router 123-P router 124-P router 125-P router 126-PE router 112, which is 5 hops. The use of different routes (e.g., segments) and encryption key patterns may be based on different factors, which are disclosed in more detail herein. Further obfuscation may be achieved by utilizing not only the best route, but sub-optimal routing paths in at the same time in parallel as the best path. At step 164, based on the determined route of step 163, orchestrator 131 may communicate encryption information (with different keys) to each router along the route to the destination, which may be CE router 111 or some other device (which may be within a customer's network).

Figure 5:
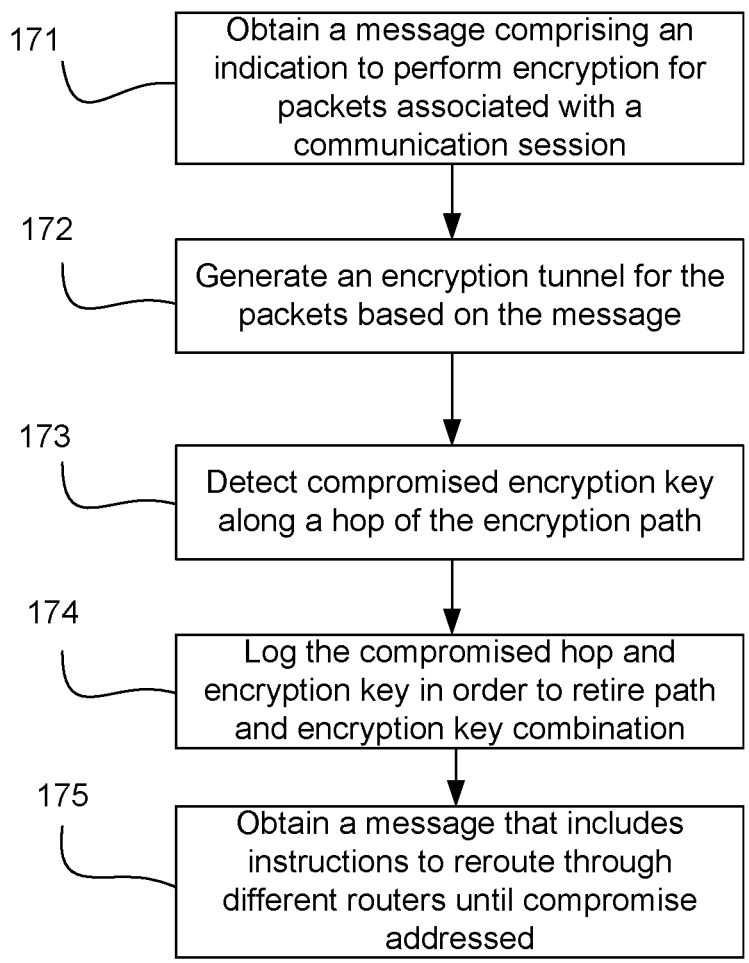
FIG. 5 illustrates an exemplary method for dynamic encryption or packet segmentation.

FIG. 5 illustrates an exemplary method for dynamic encryption or packet segmentation. At step 171, P router 124 may obtain a message comprising an indication to perform encryption of packets for a communication session (e.g., video communication or file transfer session). The message may be from orchestrator 131. At step 172, P router 124 may generate an encryption tunnel (e.g., tunnel 132) for the packets of the video communication session based on the message of step 171. The encryption may be based on the strongest encryption algorithms such as quantum-resistant algorithms. Tunnel 132 may be one hop (out of multiple hops) along a path to a destination (e.g., CE router 111). At step 173, P router 124 may detect a compromised encryption key for tunnel 132, which is a hop along the path to the destination. For further context, compromising tunnels may be based on a compromised encryption key—a key that an adversary has maliciously obtained for nefarious use. Encryption keys are difficult to guess, so obtaining a key would allow a malicious user to successfully unencrypt and read the data in the tunnel in the clear (non-encrypted). Certificate Authorities (CAs) maintain a list of compromised certificates and keys called the "certificate revocation list" (CRL). This list is distributed out to the network of CAs to tell other CAs which keys to not trust. At step 174, P router 124 may log the compromised hop and encryption key in order to retire (e.g., prevent from future use) the path and encryption key combination. The log may be sent to orchestrator 131 and may be used for subsequent dynamic encryption or packet segmentation management. At step 175, based on sending the log at step 174, P router 124 may receive instructions to reroute packets for the video communication or file transfer session through different routers (e.g., router 126) and create a different tunnel (e.g., tunnel 133) until P router 125 (or the tunneling mechanism between P router 124 and P router 125) can be determined to be secure.

As disclosed herein, there may be different factors that are considered to determine packet segmentation or dynamic encryption as disclosed herein. For example, at step 153 the plurality of routes may be determined based on obtained indication of a minimum number of different routes or minimum percentage of different routes. The number of different routes may be based on other factors such as level of security indicated (e.g., desired key length), type of traffic (e.g., video, voice, application specific), minimum latency requirements, minimum processor requirements for routers along the path, or minimum memory requirements for routers along the path, among other things. The different routes and encryption may be mixed as needed. For example, for more time sensitive applications there may be one or two (rather than 5) routes with encryption. In another example, there may just be packet segmentation without encryption because of considerations with regard to energy intensive processing, applications sensitive to jitter, or communication sessions sensitive to encryption. It is contemplated herein that the size of the packets (e.g., in packet segmentation) or the string of consecutive packets along a route may be based on the aforementioned factors. Although here example factors are applied to different routes, it is contemplated that these factors may be used for encryption considerations as well.

It is contemplated that orchestrator 131 may provide instructions to each router along the path to send packets of the communication session along different routes. The video communication or file transfer session may be defined by application (e.g., video media player or email) or time (e.g., 5 minutes), among other things, and the document file could consider file size (e.g., in number of bytes) or complexity (e.g., how difficult to reassemble). It is further contemplated that the components and method steps as disclosed herein (e.g., in reference to FIG. 1-FIG. 7) may be mixed or matched, such as connectivity as in block 109 of FIG. 1 for FIG. 3 or orchestrator 131 of FIG. 3 used for FIG. 1 related packet segmentation.

The disclosed techniques may increase the complexity and attack surface for malicious actors. The number of tunnels and paths may reduce the likelihood that a section is compromised. Dynamically allocating tunnel keys provides additional complexity where the use of the keys may be of short duration (e.g., 5 keys during a 1 minute video communication session). The service provider network may dynamically generate and allocate encryption keys to network elements. The dynamic generation may be based on a frequency-hopping type algorithm or may be a random or a pseudo-random pattern. Further there may be the creation of one tunnel per micro-segmentation packet bundle (e.g., plurality of packets as disclosed in step 154). For further context, micro-segmentation may be considered how many packets are in one stream that was broke off from the main file. Routing may be dynamic in combination with the dynamic key allocation where a data stream is broken up by certain packets whereby even if a small amount of packets are compromised within a tunnel chain, the entire data stream is not compromised.

Figure 6:
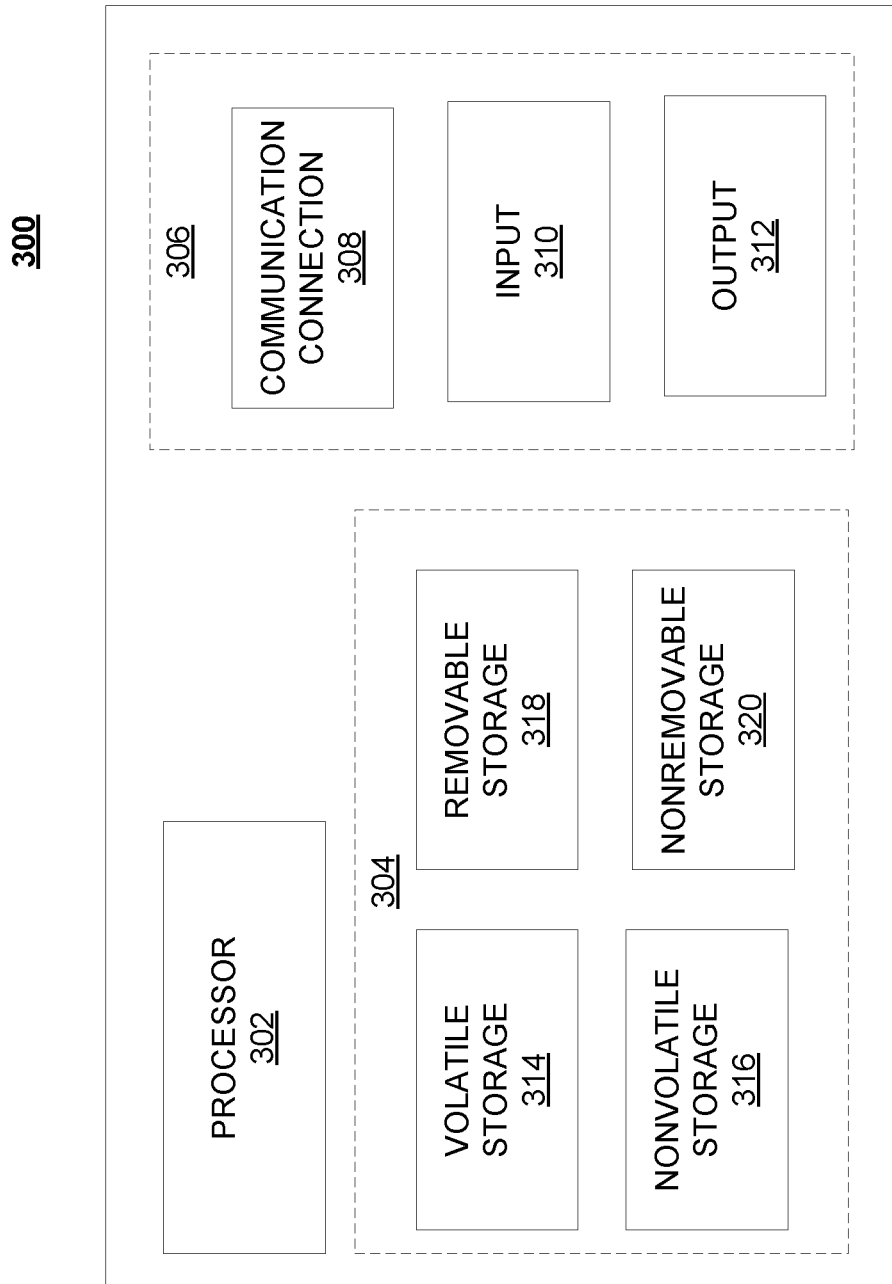
FIG. 6 illustrates a schematic of an exemplary network device.

FIG. 6 is a block diagram of network device 300 that may be connected to or comprise a component of FIG. 1 or FIG. 3. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
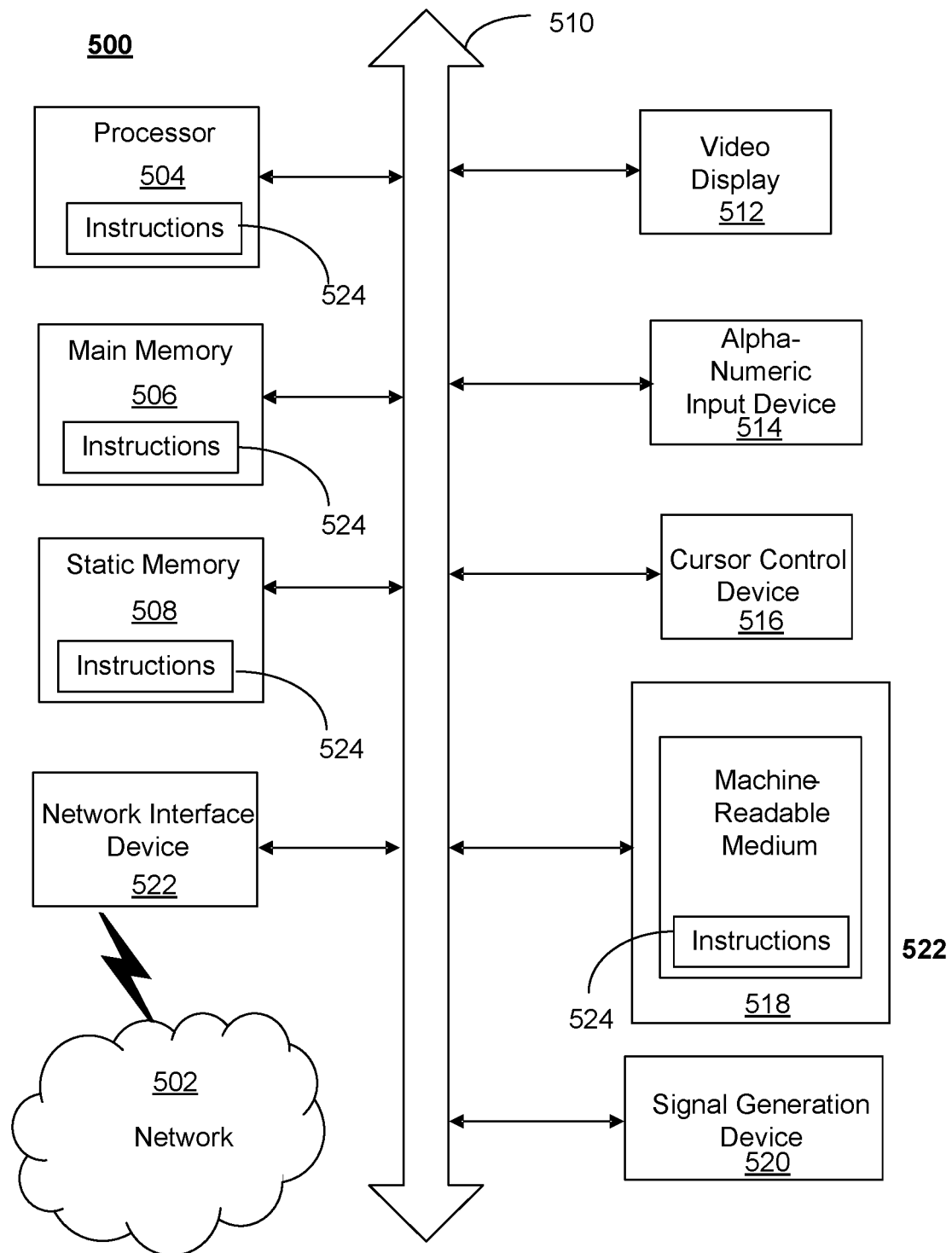
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, CE router 101, CE router 111, PE router 102, PE router 112, P router 103, orchestrator 131, and other devices of FIG. 1, FIG. 3, and FIG. ZZ2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 526 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 8A:
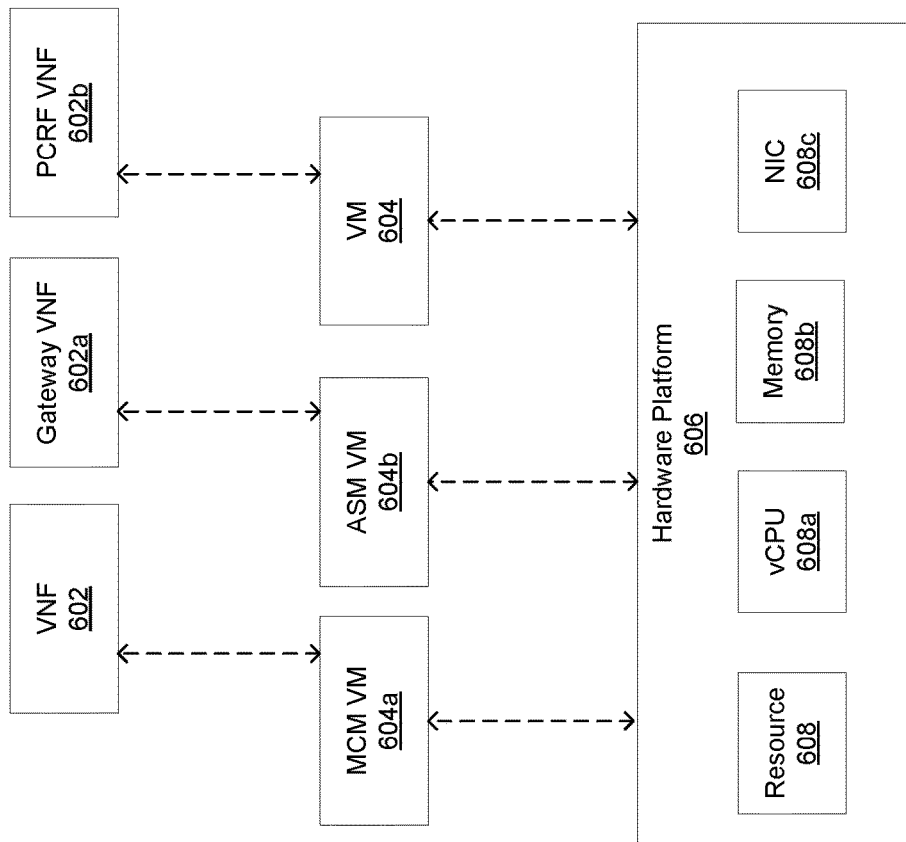
FIG. 8a is a representation of an exemplary network.

FIG. 8a is a representation of an exemplary network 600. Network 600 (e.g., network 103) may comprise an SDN—for example, network 600 may include one or more virtualized functions implemented on general purpose hardware, such as in lieu of having dedicated hardware for every network function. For example, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 8a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 8a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 8B:
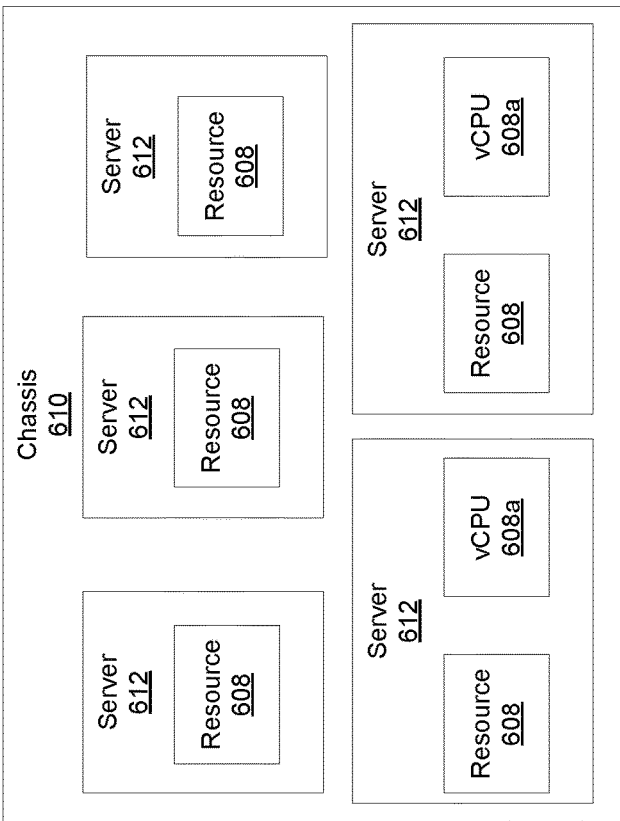
FIG. 8b is a representation of an exemplary hardware platform for a network.
Figure 8B:
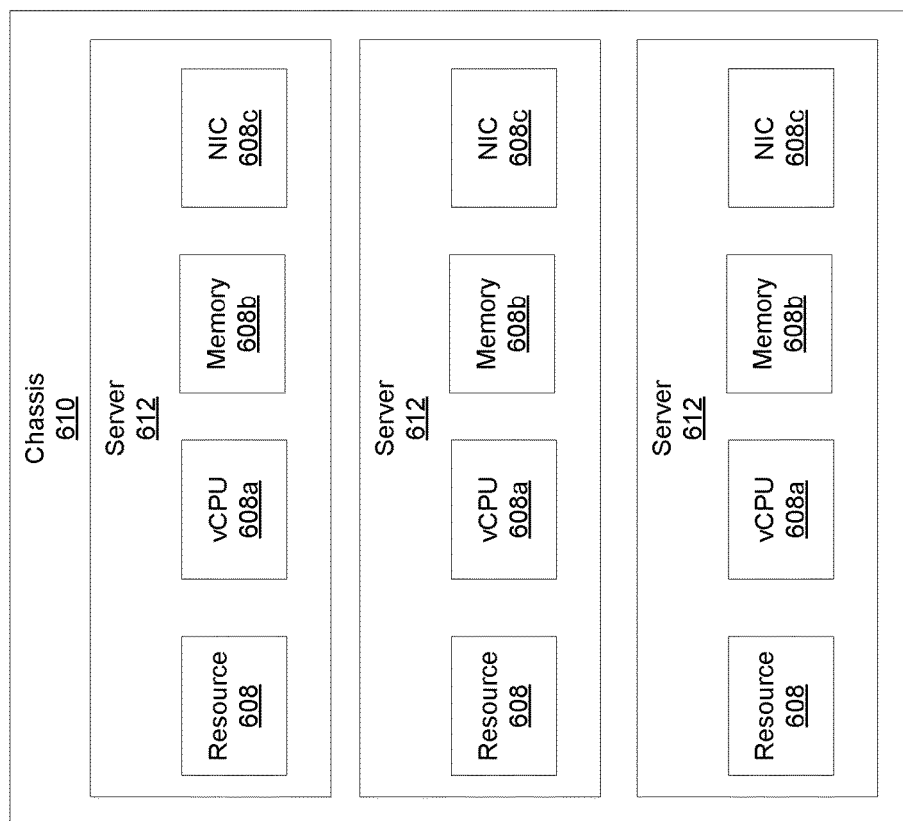

While FIG. 8a illustrates resources 608 as collectively contained in hardware platform 606, the configuration of hardware platform 606 may isolate, for example, certain memory 608c from other memory 608c. FIG. 8b provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 8b illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (e.g., consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)— would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which dynamic encryption or packet segmentation can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamic encryption or packet segmentation—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

In an example, an apparatus may include a processor and a memory coupled with the processor that effectuates operations. The operations may include detecting a communication session to a first address, wherein the communication session may include a first plurality of data packets and a second plurality of data packets; determining a plurality of routes to the first address, wherein the plurality routes may include a first route and a second route; receiving an indication of packet segmentation and encryption; based on the indication of packet segmentation and encryption, sending the first plurality of data packets of the communication session to the first route and sending the second plurality of data packets of the communication session to the second route. The first route may include a first plurality of routers, and the second route may include a second plurality of routers, wherein the first plurality of routers and the second plurality of routers are different. Each hop of the first route and the second route may be encrypted using randomly generated encryption keys, which may be from a centrally based software-defined network controller. The operations may be executed by one or more devices, such as a router, switch, or software-defined network controller.

What is claimed:

1. A system comprising:
one or more processors; and
memory coupled with the one or more processors, the memory storing executable instructions that when executed by the one or more processors cause the one or more processors to effectuate operations comprising:
detecting a communication session established using at least a first address, wherein the communication session comprises a first plurality of data packets and a second plurality of data packets;
obtaining an indication for packet segmentation for the communication session;
based on the indication for packet segmentation, determining a plurality of routes to the first address, wherein the plurality of routes comprise a first route and a second route;
based on the determined plurality of routes and the indication for packet segmentation,
sending the first plurality of data packets of the communication session to the first route; and
sending the second plurality of data packets of the communication session to the second route,
wherein the first route comprises a first plurality of routers, and the second route comprises a second plurality of routers, wherein the first plurality of routers and the second plurality of routers are different, wherein the first route and the second route each comprise a respective plurality of hops.

2. The system of claim 1, wherein the first plurality of routers and the second plurality of routers comprise different virtual routers.

3. The system of claim 1, wherein each hop of the first route and the second route are encrypted using randomly generated encryption keys from an orchestrator device.

4. The system of claim 1, wherein the one or more processors are included as part of a switch.

5. The system of claim 1, wherein the determined plurality of routes to the first address is based on a minimum number of routes required.

6. The system of claim 1, wherein the determined plurality of routes to the first address is based on type of communication session, wherein the type of communication session is a connection-less session.

7. The system of claim 1, wherein the determined plurality of routes to the first address is based on type of communication session, wherein the type of communication session is a connection-oriented session.

8. A method comprising:
detecting, by a processor, a communication session established using at least a first address, wherein the communication session comprises a first plurality of data packets and a second plurality of data packets;
obtaining, by the processor, an indication for packet segmentation for the communication session;
based on the indication for packet segmentation, determining, by the processor, a plurality of routes to the first address, wherein the plurality of routes comprises a first route and a second route;
based on the determined plurality of routes and the indication for packet segmentation,
sending, by the processor, the first plurality of data packets of the communication session to the first route; and
sending, by the processor, the second plurality of data packets of the communication session to the second route,
wherein the first route comprises a first plurality of routers, and the second route comprises a second plurality of routers, wherein the first plurality of routers and the second plurality of routers are different, wherein the first route and the second route each comprise a respective plurality of hops.

9. The method of claim 8, wherein the first plurality of routers and the second plurality of routers comprise different virtual routers.

10. The method of claim 8, wherein each hop of the first route and the second route are encrypted using randomly generated encryption keys from an orchestrator device.

11. The method of claim 8, wherein the determined plurality of routes to the first address is based on a minimum number of routes required.

12. The method of claim 8, wherein the determined plurality of routes to the first address is based on type of communication session, wherein the type of communication session is a connection-less session.

13. The method of claim 8, wherein the determined plurality of routes to the first address is based on type of communication session, wherein the type of communication session is a connection-oriented session.

14. A tangible computer readable storage medium storing computer executable instructions that when executed by a computing device cause said computing device to effectuate operations comprising:
detecting a communication session established using at least a first address, wherein the communication session comprises a first plurality of data packets and a second plurality of data packets;
obtaining an indication for packet segmentation for the communication session;
based on the indication for packet segmentation, determining a plurality of routes to the first address, wherein the plurality of routes comprises a first route and a second route;
based on the determined plurality of routes and the indication for packet segmentation,
sending the first plurality of data packets of the communication session to the first route; and
sending the second plurality of data packets of the communication session to the second route,
wherein the first route comprises a first plurality of routers, and the second route comprises a second plurality of routers, wherein the first plurality of routers and the second plurality of routers are different, wherein the first route and the second route each comprise a respective plurality of hops.

15. The tangible computer readable storage medium of claim 14, wherein the first plurality of routers and the second plurality of routers comprise different virtual routers.

16. The tangible computer readable storage medium of claim 14, wherein each hop of the first route and the second route is encrypted using randomly generated encryption keys from an orchestrator device.

17. The tangible computer readable storage medium of claim 14, wherein the determined plurality of routes to the first address is based on a minimum number of routes required.

18. The tangible computer readable storage medium of claim 14, wherein the determined plurality of routes to the first address is based on type of communication session, wherein the type of communication session is a connectionless session.

19. The tangible computer readable storage medium of claim 14, wherein the determined plurality of routes to the first address is based on type of communication session, wherein the type of communication session is a connection-oriented session.

20. The tangible computer readable storage medium of claim 14, wherein each hop of the first route and the second route is encrypted using randomly or pseudo-randomly allocated encryption keys from an orchestrator device.

* * * * *